TEMPORARY NOTICE of BEST AVAILABLE IMAGE

U. S. PATENT AND TRADEMARK OFFICE

---

THE SCANNED IMAGES OF PATENT NUMBER 8983 1/2 X FOR THE ISSUE DATE OF

7/21/1835 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

---

TEMPORARY NOTICE of BEST AVAILABLE IMAGE

Jordan L. Mott 8983½X
Letters Patent

The Schedule referred to in these Letters Patent and making part of the same containing a description in the words of the said Jordan L. Mott himself of his improvement in the Stove

---

To all whom it may concern

Be it known that I Jordan L. Mott of the City of New York in the State of New York have invented an improvement in the manner of constructing the stoves for which letters patent of the United States were granted to me on the thirtieth day of December 1833, And I do hereby declare that the following is a full and exact description of my said improvement. The combined stove called and patented by me, as above was intend ed to unite the advantage of the close stove with those of an open fire place and I have heretofore been in the practice of casting the front part thereof in four separate pieces, namely, a front piece two jambs. and the inclined plane, or curved plate (described in my former specification) which conveys the fuel into the grate, but I have found this proceedure to be productive of considerable inconvenience, or in as much as the ordinary defect in casting frequently rendered it difficult to adapt these pieces properly to each other, and more especially from the burning out of the lower edge of the inclined or curved plate. To obviate the first of these difficulties, I now cast the entire front consisting of the inclined or curved plate, the horizontal plates above it forming the front of the close part of the stove, and the two jambs, from a single pattern in one piece with the exception of the lower and middle part of the inclined or curved plate, which in order to obviate the second difficulty above alluded to namely, the burning out of that part thereof which is in contact with the fire, I usually cast in a separate piece, This separate piece I make of sufficient length an width to sustain the whole effect of the fire so far as the burning out of the curved or inclined plate is concerned, the separate piece so cast is received in a recess corresponding therewith in the 8983 1/2 X the inclined or curved plate and is retained in its place by suitable
ledges and a screw or pin attaching the two parts to each other. To give
strength and durability to this separate piece I form ridges or reeds along
or across the outside thereof, leaving the inside smooth for the ready descent
of the fuel. Although I prefer to make a separate plate in the way de-
scribed, as in case of its burning out, it is then readily removed without
disturbing any other part. I sometimes merely form ridges or reeds upon
the outside of the inclined or curved plate, cast in one continuous piece
with the parts before named; such ridges or reeds occupying the parts
liable to be burnt out, and considerably increasing its durability.
What I claim as my improvement upon the combined Stove as patented
by me at the within mentioned date is the casting the entire front there
of in one piece in the manner set forth, with the addition of the ridg
es or reeds upon that part of the inclined or curved plate which is
directly exposed to the action of the fire. I also claim the making or cast
ing of that portion of the inclined or curved plate which is so exposed
in a separate and distinct piece in the manner and for the purpose
herein set forth Exd. Witnesses
[illegible] John Dewison Jr.
Thomas H. Mills Jordan L. Mott (July 21. 1835.)

(598 words)

(Drawing)